H. C. WIEDEMAN.
JOINT.
APPLICATION FILED JULY 30, 1914.
1,161,430.
Patented Nov. 23, 1915.
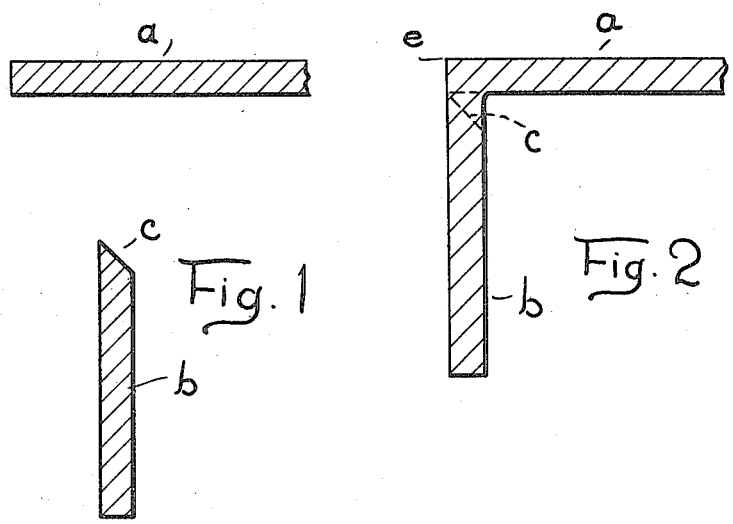
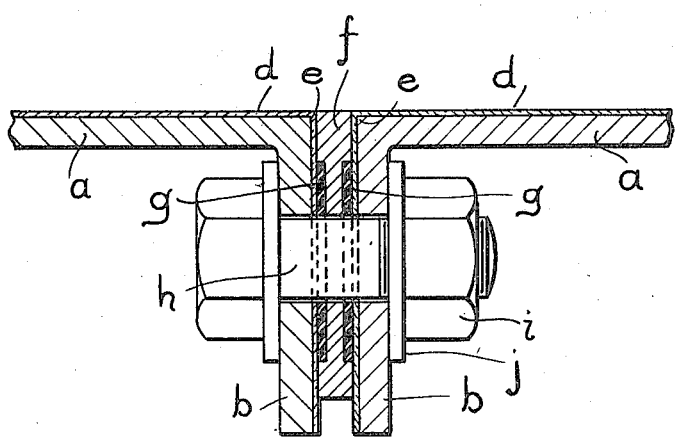

UNITED STATES PATENT OFFICE.

HENRY C. WIEDEMAN, OF DETROIT, MICHIGAN.

JOINT.

1,161,430. Specification of Letters Patent. Patented Nov. 23, 1915.

Application filed July 30, 1914. Serial No. 854,205.

*To all whom it may concern:*

Be it known that I, HENRY C. WIEDEMAN, a citizen of the United States, residing at Detroit, county of Wayne, State of Michigan, have invented a certain new and useful Improvement in Joints, and declare the following to be a full, clear, and exact description of the same, such as will enable others skilled in the art to which it pertains to make and use the same, reference being had to the accompanying drawings, which form a part of this specification.

This invention relates to a joint for enameled plates and especially a joint for glass-enameled tanks.

In the drawings, Figure 1, shows the plate and flange before they are welded together. Fig. 2, shows the plate and the flange after they are welded together and before the enameling is put on. Fig. 3, is a sectional view of a joint.

Heretofore joints for glass-enameled tanks have been made by bolting together the outwardly projecting flanges of adjacent tank sections. The flanges have been made by bending outwardly the plates that form the sections. This, however, has made a rounded corner so that a flush joint was not possible. These grooves at the joints and on the inside of the tanks have been objectionable because things settle in them and they are hard to keep clean, and, too, they are somewhat unsightly.

It is the object of the present invention to do away with this undesirable and unsightly groove by providing a flush joint. This flush joint is made possibly by square or right-angular corners on the outside of the angle formed by each flange and its plate. These tanks are usually made of rolled steel. Up to the present time it has been an impossibility to roll square corners between the flange portions and web portions in plates of sufficient size for tanks. It has been proposed to bolt, or otherwise fasten, angle-iron flanges upon the plates, but this has been found impractical with glass-enameled tanks, for the reason that it makes the metal to be enameled thicker at one place than another. Absolute uniformity in thickness of the metal is required for otherwise when the tank is being enameled there will be a disparity of heat at different places. Consequently enough heat to fuse the enamel at one location will burn the enamel at another. My invention overcomes these difficulties by welding the flanges to the plates in such a manner as to procure uniformity of thickness of the flange and the plate.

*a* represents the plate of a section of a steel tank; *b* the flange. In acetylene welding I prefer to bevel off the flange as at *c*. Welding wire is then used with the acetylene burner to fill up the gap between the flange and plate, when the two are brought into contact and into right-angular relation. The flanges and plates are then fused together as shown in Fig. 2, maintaining substantial uniformity of thickness for the flange and the plate. The operation may be effected by electric or other welding processes.

After the flange is welded to the plate the whole inner face of the plate and the flange is glass-enameled. This forms the coat of enamel *d*. The welding leaves the corners *e* square. For the purpose of reference in the claims the side of the plate that is subsequently enameled will be designated "the face", and the opposite side will be designated "the rear". The flanges of two adjacent sections are thereupon brought together and a combination gasket *f* inserted between the two opposed faces of the flanges. The outer edge of the gasket is brought flush with the faces of the plates. This combination gasket *f* is grooved to receive two rubber gaskets *g*. The bolt *h* having a screw-threaded end is passed through perforations in the flanges and the nut *i* is run upon the threads. By tightening the nut *i* against the washer *j* the two flanges are brought tightly against the rubber packing and the gasket, making the joint.

From the above description it will be seen that I get a joint which is absolutely flush. This type of joint makes possible the use of rectangular or round tanks for breweries, creameries and the like. By the use of this type of joint the objectionable features of a great number of grooved joints is overcome and therefore a rectangular tank may be built up of numerous sections of small enough size so they can be enameled and the enamel baked in the enameling furnace without liability of warping the plates.

What I claim is:

1. The method of making a joint between two plates so that one side of the joint will be free of grooves, comprising the welding of a flange at its edge to the rear of each of two plates which have at their adjacent edges corners between the edges and the faces of the plate, which corners are truly complementary, so that their two angles when added together form the resulting angle of the joint, and the securing of the two welded flanges together to bring the two said corners into complementary relation.

2. The method of joining enameled plates provided with adjacent edges having corners of a defined angularity and complementary to each other, comprising the welding of flanges of substantially the same thickness as the plates to the plates upon the side of the plates opposite to the plate sides having the complementary angles, the said flanges being welded to the plates at one edge of each flange, the enameling of the plates and the inside of the flanges adjacent the plates by the aid of heat and securing the said flanges together to bring the said corners of complementary angularity together.

3. The method of making a flush joint between two plates, comprising the welding of of a flange at its edge and perpendicularly to the rear of each of two plates which have at their adjacent edges substantially true right angle corners between their edges and their faces, and the securing of the flanges together to bring the faces of the plates in substantially the same plane.

In testimony whereof, I sign this specification in the presence of two witnesses.

HENRY C. WIEDEMAN.

Witnesses:
STUART C. BARNES,
MARIETTA E. RUDD.

Copies of this patent may be obtained for five cents each, by addressing the "Commissioner of Patents, Washington, D. C."